ated Mar. 17, 1970

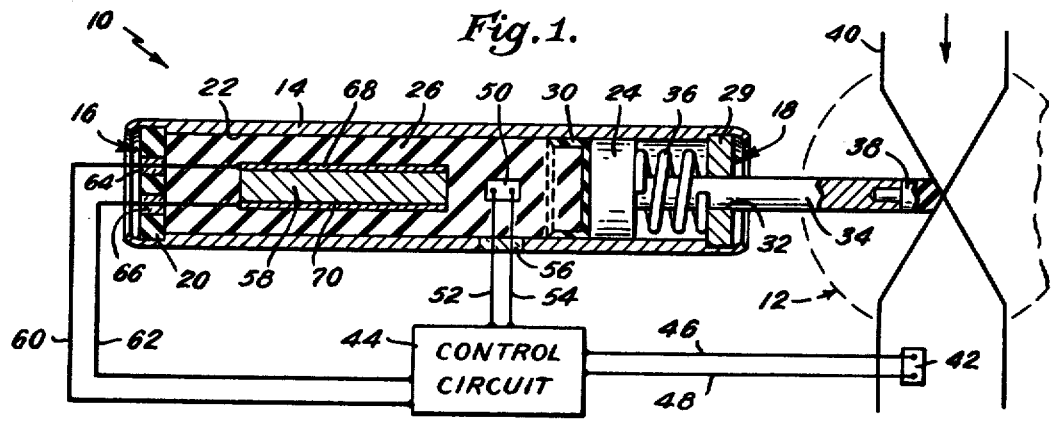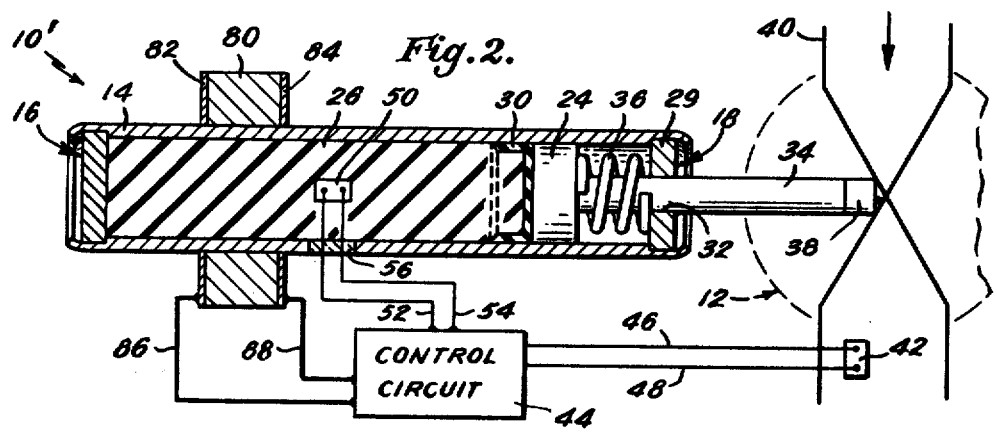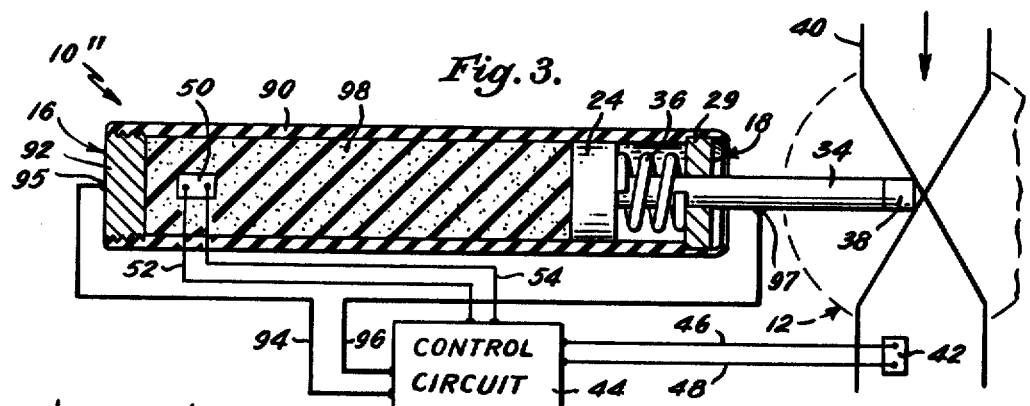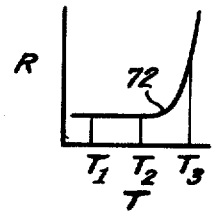

3,500,634
CONTROL SYSTEM AND ACTUATOR
USED THEREIN
Joseph W. Waseleski, Jr., Mansfield, and Francis P. Buiting, Plainville, Mass., assignors to Texas Instruments Incorporated, Dallas, Tex., a corporation of Delaware
Filed Jan. 2, 1968, Ser. No. 694,915
Int. Cl. F03g 7/06; G05d 15/00; F16k 31/18
U.S. Cl. 60—23          17 Claims

ABSTRACT OF THE DISCLOSURE

A control system in which the output of an actuator is used to change a first condition, such as the quantity of a fluid flowing through a conduit by modulating a valve opening. A second condition of the fluid such as temperature, is sensed and gives an electrical signal which is integrated with a standard in a control circuit to result in a controlled energization of the actuator. The actuator comprises thermally expandable material confined in a pressure chamber having an output element or piston, which is spring biased against the material. A heater is used to control the temperature of the thermally expandable material, and hence the amount of expansion of the material and the travel of the piston. The piston is connected to the valve in the conduit by a conventional piston rod. The heater is formed of a mass of material having a positive temperature coefficient (PTC) of resistance and a sharply defined transition temperature above which the material's resistance increases sharply. In one embodiment the PTC heater is embedded in the thermally responsive material; in another, it is mounted on the actuator casing but in heat transfer relation to the material; in yet another, PTC material is dispersed throughout the thermally responsive material; and in another embodiment the thermally responsive material is made a part of the heating element by incorporating conductive particles such as carbon black therethrough. A temperature sensor is mounted in heat transfer relation to the thermally expandable material, preferably embedded therein, the electrical signal from which, along with the signal from the fluid condition sensor, is compared with a standard in the control circuit. The resultant signal then controls the heater energization current to maintain the temperature of the expandable material at the desired level and concomitantly the piston travel.

Briefly, this invention relates to a control system in which a condition, such as the quantity of fluid flowing in a conduit is controlled by the amount of valve opening in the conduit which valve opening is determined by the sensing of another condition, such as the temperature of the fluid medium, the signal of which is fed into a control circuit which varies the energization of a novel actuator device. The actuator device is one which converts thermal energy into translational movement. The actuator employs thermally expandable material in conjunction with a controlling heating element. The material is confined in a pressure chamber and provided with an output element or piston which is moved by the expanding material upon increases in temperature.

Actuators of this type are known in the art, such as the device disclosed in the U.S. patent to Carlson et al. No. 3,263,411, issued Aug. 2, 1966, in which a heating element is embedded in thermally expandable material. This type of actuator suffers from certain limitations in that the heater must be separately and indirectly controlled as by an externally mounted thermostat. Another limitation is that the heater tends to deteriorate the expandable material contiguous thereto due to its high temperature since the thermostat normally sees the temperature outside the expandable material. Another approach is taught by the U.S. patent to Asakawa et al., No. 3,016,691, issued Jan. 16, 1962 in which conductive particles are dispersed in thermally expandable material. This device also must be controlled indirectly and separately. Further, in both of the above devices, there is no effective limit to the movement of the output member except as provided by the separate thermostat limiting the energizing heater current. In conventional heaters another disadvantage is that varying voltage conditions vary the temperature of the heating element, even permitting thermal run away with severe variations.

Among the several objects of the present invention may be noted the provision of a converter of electrical energy into mechanical movement employing a relatively small, compact, simple, inexpensive device. Another object is to provide a device which converts thermal energy into translational mechanical movement. Another object is a provision of an actuator comprising thermally expandable material, the temperature of which is controlled by a heating element in heat transfer relation thereto which heating element is self-regulated to obviate any deterioration of the expandable material and to provide a limitation on the movement of the actuators output member. Still another object is the provision of a control system in which a fluid medium passing through a conduit is controlled by a modulating valve connected to the actuator.

The invention accordingly comprises the constructions hereinafter described, the scope of the invention being indicated in the appended claims.

In the accompanying drawings, in which several of the various possible embodiments of the invention are illustrated, FIGURE 1 is a schematic flow and circuit diagram of a control system and a cross-section of an actuator employed therein.

FIGURE 2 shows the same control system but employing a second embodiment of the actuator.

FIGURE 3 shows the same control system with a third embodiment of the actuator member; and FIGURE 4 shows a resistivity versus temperature curve of the heating element employed in the actuators.

Corresponding reference characters indicate corresponding parts throughout the several views of the drawings.

Referring now to FIGURE 1, a thermally responsive actuator according to a first embodiment is shown generally designated by reference numeral 10, in operative relationship with a valve member generally indicated by reference numeral 12. Thermally responsive actuator 10 includes a fistula or tubular member 14 which may be formed of any suitable material. Tubular member 14 is preferably open-ended as at 16 and 18. Disc 20 is mounted in the open end 16 of tubular member 14 to close and seal that end. Disc 20 is held in place, as by crimping the open end of the tube as shown, to provide a sealed closed end portion and a cavity or bore 22 within the tubular member 14. Obviously this closure could be formed integrally with the tubular member 14, if desired. A piston 24 is slidably received in bore 22.

Thermally responsive material 26, such as silicone rubber, is located in bore 22 between the piston 24 and disc 20. The material 26 chosen is governed by the temperature coefficient of expansion, both direction and magnitude, best suited for the particular design parameters involved. A sealing cap 30 as described in U.S. patent, No. 3,212,337, may be employed, if desired. Tubular member 14 is closed at end 18 by a disc member 29 which is provided with an aperture 32 through which piston rod 34 slidingly extends. A spring 36 may be located between piston 24 and disc 29 which tends to bias piston 24 toward end 16 of tubular member 14 to facilitate return of the piston when the thermally expandable material contracts. Piston rod 34, preferably provided with insulating cap member 38, is attached to valve 12 in conduit 40. As rod 34 moves to the right as shown in FIGURE 1, it closes the opening of valve 12. The volume of a fluid medium which is transported in conduit 40 in the direction of the arrow is thus controlled by the displacement of the rod 34. A temperature sensor 42 is placed in the conduit, shown downstream of valve member 12; however, it will be obvious that it could be located elsewhere, and senses the temperature of the fluid medium sending an electrical signal proportional thereto to control circuit 44 via leads 46, 48. The signal from a temperature sensor 50, preferably embedded in thermally expandable material 26 is also fed to circuit 44 via leads 52, 54 extending through eyelet 56. These signals are together compared with a preselected program and the energization of heating element 58 is modulated thereby. The heating current passes through leads 60, 62 to heating element 58. It will be noted that electrically insulating eyelets 64, 66 are provided in disc 20 to electrically isolate leads 64, 66. Conductive layers 68, 70 are located on spaced surfaces of heating element 58 to which leads 60, 62 respectively are attached. As seen in FIGURE 4, the characteristics of the resistivity temperature (RT) curve is such that the resistance changes very little below an anomaly or threshold point 72 so that between points T1 and T2 the temperature can be related to displacement of the piston to obtain a very accurate control while beyond point 72 a self-regulating limit occurs on the steep portion of the curve, i.e., T3. If sufficient current is permitted to pass through heating element 58, the resistance element will self-heat raising the temperature until the threshold point 72 is passed beyond which point the resistance rapidly increases until an equilibrium point is reached as at T3. This temperature corresponds to a particular volume of the expandable material and hence the throw or travel of piston 24 is effectively limited at this point.

The material comprising heater 58 possesses a resistance characteristic having a positive temperature coefficient (PTS) and a sharply defined transition temperature above which the material's resistance increases sharply. Examples of such materials are barium titanate doped with lanthanum ($Ba_{.997}La_{.003}TiO_3$) and polyethylene filled with carbon black under certain conditions, known in the art. These materials have heretofore been employed in PTC thermistors. While silicone rubber is an excellent material to be used as the thermally expandable material, it has the disadvantage of being subject to deterioration above approximately 300° F. Because of this factor, heaters used such as those shown in U.S. Patent 3,263,411, referred to supra, cannot effectively be used. One of the advantages of the instant invention is that material having a threshold point lower than that which would cause deterioration of the material, for example, 250 to 270° F. can be employed which will therefore inherently prevent harmful effects to the thermally expandable material. Another advantage is that by employing a temperature sensor embedded in the thermally expandable material, the actual temperature of the material may be directly used in controlling the exact amount of heater energization resulting in more efficient control. Still another advantage is employing the present invention is that no thermostat need be used and therefore longer life is achieved.

Below the threshold point of the expandable material, the reproducibility of the actuator position can be improved by regulation of voltage and current fluctuations of input power when sensor 50 is not used for this purpose.

A second embodiment is shown in FIGURE 2 in which actuator 10' comprises tubular member 14 having two ends 16 and 18 sealed respectively by disc 20 and piston 24. Eyelet 56 is provided in casing 14 through which extend leads 52, 54 from the temperature sensor 50 preferably embedded in thermally expandable material 50, such as silicone rubber, to the control circuit 44. PTC heating element 80, which is shown to be toroidal or annular in shape, is mounted about the periphery of member 14. Conductive layers 82, 84 are provided on opposite faces and leads 86, 88 are connected to respective layers and to the control circuit 44 in a conventional manner. Sensor 42 which may be a temperature sensor or may sense some other condition of the fluid medium passing through conduit 40 is mounted in the conduit and is connected to the control circuit 44 by leads 46, 48.

In FIGURE 3, is shown a third embodiment in which actuator 10'' comprises a tubular casing member 90 composed of an electrically insulating material which is provided with two open ends 16, 18 sealed respectively by threaded disc 92 and piston 24. Thermally expandable material 98 is contained within the casing 90 between the sealing members. Temperature sensor 50 is preferably embedded therein and is connected to control circuit 44 by leads 52, 54. Disc 92 sealing end 16 of member 90 is made of any good electrically conductive material such as copper and forms one electrode of the system. Lead 94 connects disc 92, as at 95, to control circuit 44. Piston 24 acts as the other electrode and is connected to control circuit 44 via piston rod 34 and lead 96 connected thereto at 97 in any convenient member. In all of the above embodiments an electrically insulating member 38 may be mounted on the end of piston rod 34 to isolate the actuator from the valve. Thermally expandable material 98 may consist of silicone rubber or similar material in which is dispersed a carbon black filled polymer such as polyethylene to form the PTC heating element. Alternatively, expandable material 98 may form the PTC heating material itself by using carbon black filled polyethylene by itself.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A control system comprising:
   (a) means for sensing a first condition and creating an electrical impulse which varies with changes in the condition,
   (b) a thermally responsive actuator,
   (c) thermally expandable material contained in the actuator,
   (d) means for changing the temperature of the thermally expandable material,
   (e) means for sensing the temperature of the thermally expandable material and creating an electrical impulse which varies with temperature change,
   (f) means operatively connected to the actuator for changing a second condition, and
   (g) control circuit means which compares the electrical impulse dependent upon the first condition and the electrical impulse dependent upon the temperature of the thermally expandable material to a preselected standard and accordingly varies the energization to the means for changing the temperature of the thermally expandable material thereby changing the second condition through the actuator.
2. A system according to claim 1 in which the means operatively connected to the actuator is a valve in a fluid carrying conduit.

3. A system according to claim 1 in which the means for changing the temperature of the thermally expandable material is a mass of material having a positive temperature coefficient (PTC) of resistance and a sharply defined transistion temperature above which the material's resistance increases rapidly.

4. A system according to claim 3 in which the PTC heating element is embedded in the thermally expandable material.

5. A system according to claim 3 in which the PTC heating element is mounted in juxtaposition to the thermally expandable material in heat transfer relation thereto.

6. A system according to claim 3 in which the PTC heating element comprises a material dispersed throughout the thermally expandable material.

7. A system according to claim 3 in which carbon black particles are dispersed in the thermally expandable material to form the PTC heating element.

8. A thermally responsive actuator comprising:
   (a) a fistula casing having two open ends,
   (b) means to seal the first end,
   (c) piston means to seal the second end,
   (d) thermally expandable material contained in the casing between the means sealing the first end and the piston means,
   (e) a piston rod connected to the piston and extending beyond the second end,
   (f) a steep-sloped, self-regulating, PTC heating element having a transition temperature above which the resistance increases sharply with temperature mounted in heat transfer relation to the thermally expandable material, and
   (g) means for controlling current to said heating element in response to sensed temperature of said thermally expandable material.

9. An actuator according to claim 8 in which the PTC heating element is mounted on the external wall of the casing.

10. An actuator according to claim 9 in which the PTC heating element is a toroid and is mounted about the periphery of the casing.

11. An actuator according to claim 8 in which the PTC heating element is embedded within the thermally expandable material.

12. An actuator according to claim 8 in which the PTC heating element is a material dispersed throughout the thermally expandable material.

13. An actuator according to claim 8 in which carbon black particles are dispersed in the thermally expandable material to form the PTC heating element.

14. An actuator according to claim 8 in which the means sensing temperature is embedded in the thermally expandable material.

15. An actuator according to claim 9 in which the PTC material is formed of $Ba_{.997}La_{.003}TiO_3$.

16. An actuator according to claim 11 in which the PTC material is formed of $Ba_{.997}La_{.003}TiO_3$.

17. A system according to claim 1 in which the means for sensing the temperature of the thermally expandable material includes a temperature sensor embedded in the expandable material.

References Cited

UNITED STATES PATENTS

| | | | |
|---|---|---|---|
| 1,958,660 | 5/1934 | Frazer | 60—23 |
| 2,906,849 | 9/1959 | Jensen et al. | 219—39 |
| 3,016,691 | 1/1962 | Asakawa et al. | 60—23 |
| 3,131,269 | 4/1964 | Asakawa | 73—363 X |
| 3,212,337 | 10/1965 | McCarrick | 73—368.3 |
| 3,231,522 | 1/1966 | Blodgett et al. | 338—22 |
| 3,243,753 | 3/1966 | Kohler | 338—22 X |
| 3,263,411 | 8/1966 | Carlson et al. | 60—23 |
| 3,375,774 | 4/1968 | Fujimura et al. | 338—22 |

CARROLL B. DORITY, JR., Primary Examiner

U.S. Cl. X.R.

236—68; 251—11